(12) United States Patent
Perfilev et al.

(10) Patent No.: US 12,189,771 B2
(45) Date of Patent: Jan. 7, 2025

(54) METHOD AND SYSTEM FOR DETECTING MALICIOUS ACTIVITY

(71) Applicant: F.A.C.C.T. NETWORK SECURITY LLC, Moscow (RU)

(72) Inventors: Sergei Sergeevich Perfilev, Permskij krai (RU); Nikolay Nikolaevich Andreev, Khimki (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 423 days.

(21) Appl. No.: 17/585,993

(22) Filed: Jan. 27, 2022

(65) Prior Publication Data
US 2022/0147631 A1 May 12, 2022

Related U.S. Application Data

(63) Continuation of application No. PCT/RU2020/000319, filed on Jun. 30, 2020.

(30) Foreign Application Priority Data
Jun. 26, 2020 (RU) .............................. 2020121186

(51) Int. Cl.
*H04L 29/06* (2006.01)
*G06F 21/56* (2013.01)
*G06N 20/00* (2019.01)

(52) U.S. Cl.
CPC ........... *G06F 21/566* (2013.01); *G06N 20/00* (2019.01); *G06F 2221/034* (2013.01)

(58) Field of Classification Search
CPC ............. G06F 21/566; G06F 2221/034; G06F 21/564; G06N 20/00; G06N 3/08;
(Continued)

(56) References Cited

U.S. PATENT DOCUMENTS 9,245,114 B2 1/2016 Thomas et al.
9,256,735 B2 2/2016 Stute
(Continued)

FOREIGN PATENT DOCUMENTS

RU 2451326 C2 5/2012
RU 2706896 C1 11/2019

OTHER PUBLICATIONS

Search Report with regard to the RU Patent Application No. 2020121186 completed Jan. 28, 2021.
(Continued)

*Primary Examiner* — William A Corum, Jr.
(74) *Attorney, Agent, or Firm* — BCF LLP

(57) ABSTRACT

A method and a system for detecting a malicious activity are provided. The method comprises: receiving, from a given host of the plurality of hosts, an event flow including data representative of events occurred at the given host; analyzing a given event sequence of the event flow to generate, for a given event thereof, a respective internal event; applying to the respective internal event, a plurality of signature-based rules to determine at least one internal state marker of the given host associated with the given event; feeding the respective internal state markers to a trained machine-learning algorithm (MLA) to determine a prediction outcome thereof of whether the given event sequence is associated with the malicious activity; in response to the prediction outcome exceeding a predetermined threshold, determining the given event sequence as being associated with the malicious activity; and generating a report including the prediction outcome.

10 Claims, 3 Drawing Sheets

(58) Field of Classification Search
CPC .......... G06N 5/01; G06N 20/10; G06N 20/20; H04L 63/1408
See application file for complete search history.

(56) References Cited

U.S. PATENT DOCUMENTS

| | | | |
|---|---|---|---|
| 9,544,321 B2 | 1/2017 | Baikalov et al. | |
| 9,654,485 B1* | 5/2017 | Neumann | H04L 63/1416 |
| 10,530,802 B2 | 1/2020 | Thomas et al. | |
| 2016/0226901 A1 | 8/2016 | Baikalov et al. | |
| 2019/0207969 A1* | 7/2019 | Brown | G06F 21/552 |
| 2023/0111864 A1* | 4/2023 | Thomas | H04L 63/20 |
| | | | 726/1 |

OTHER PUBLICATIONS

International Search Report with regard to PCT/RU2020/000319 mailed Mar. 18, 2021.

* cited by examiner

100

```
┌─────────────────────────────────────────────────────────┐
│ receiving, by the processor, from a given host of the   │  110
│ plurality of hosts, an event flow including data        │
│ representative of events occurred at the given host     │
└─────────────────────────────────────────────────────────┘
                            ↓
┌─────────────────────────────────────────────────────────┐
│ analyzing, by the processor, a given event sequence     │  111
│ of the event flow having been generated for a           │
│ predetermined period, to generate, for a given event    │
│ of the given event sequence, a respective internal      │
│ event, the respective internal event being format-      │
│ invariant to other events in the event flow             │
└─────────────────────────────────────────────────────────┘
                            ↓
┌─────────────────────────────────────────────────────────┐
│ applying, by the processor, to the respective internal  │  112
│ event, a plurality of signature-based rules to          │
│ determine at least one internal state marker of the     │
│ given host associated with the given event sequence     │
└─────────────────────────────────────────────────────────┘
                            ↓
┌─────────────────────────────────────────────────────────┐
│ feeding, by the processor, the respective internal      │  113
│ state markers to a trained machine-learning algorithm   │
│ (MLA) to determine a prediction outcome thereof of      │
│ whether the given event sequence is associated with     │
│ the malicious activity                                  │
└─────────────────────────────────────────────────────────┘
                            ↓
┌─────────────────────────────────────────────────────────┐
│ in response to the prediction outcome exceeding a       │  114
│ predetermined threshold value, determining, by the      │
│ processor, the given event sequence having been         │
│ occurred at the given host as being associated with     │
│ the malicious activity                                  │
└─────────────────────────────────────────────────────────┘
                            ↓
┌─────────────────────────────────────────────────────────┐
│ generating, by the processor, a report including the    │  115
│ prediction outcome for presentation thereof to a user   │
└─────────────────────────────────────────────────────────┘
```

FIG.2

METHOD AND SYSTEM FOR DETECTING MALICIOUS ACTIVITY

CROSS-REFERENCE

The present application is a continuation of International Patent Application No.: PCT/RU2020/000319, entitled "DETECTING MALICIOUS ACTIVITY BY ANALYSING THE BEHAVIOUR OF OBJECTS IN A NON-ISOLATED ENVIRONMENT," filed on Jun. 30, 2020, the entirety of which is incorporated herein by reference.

FIELD

The present technology relates broadly to the field of cybersecurity; and, in particular, to a method and system for detecting a malicious activity by analyzing of object behavior in a non-isolated environment.

BACKGROUND

Certain prior art approaches have been proposed to tackle the problem of detecting malicious activities.

Russian Patent No.: 2,451,326-C2, issued on May 20, 2012, assigned to Microsoft Inc., and entitled "SYSTEM ANALYSIS AND CONTROL" discloses a method of system analysis and management executed by a system, which includes one or more computer programs or agents supplying data on modifications inside the system. These data include information related to all interactions with files and/or settings. Such types of interactions include such actions as reading or recording to system registry elements, files, and also binary module interactions, such as downloading, etc. Agents supply the collected data to the server service, which processes the obtained information for, for example, generation of web reports, warnings or for integration with other services in order to execute system management.

U.S. Pat. No. 9,245,114-B2, issued on Jan. 26, 2016, assigned to Verisign Inc, and entitled "METHOD AND SYSTEM FOR AUTOMATIC DETECTION AND ANALYSIS OF MALWARE", discloses a method of detecting malicious software (malware) that includes receiving a file and storing a memory baseline for a system. The method also includes copying the file to the system, executing the file on the system, terminating operation of the system, and storing a post-execution memory map. The method further includes analyzing the memory baseline and the post-execution memory map and determining that the file includes malware

SUMMARY

It is an object of the present technology to ameliorate at least inconveniences associated with the prior art.

Thus, in accordance with a first broad aspect of the present technology, there is provided a method for detection of a malicious activity by analyzing object behavior in a non-isolated environment. The method is executable by a processor communicatively coupled to a plurality of hosts of the non-isolated environment. The method comprises: receiving, by the processor, from a given host of the plurality of hosts, an event flow including data representative of events occurred at the given host; analyzing, by the processor, a given event sequence of the event flow having been generated for a predetermined period, to generate, for a given event of the given event sequence, a respective internal event, the respective internal event being format-invariant to other events in the event flow; applying, by the processor, to the respective internal event, a plurality of signature-based rules to determine at least one internal state marker of the given host associated with the given event sequence, respective internal state markers associated with the each one of the given event sequence being indicative of whether the given event sequence is associated with the malicious activity or not; feeding, by the processor, the respective internal state markers to a trained machine-learning algorithm (MLA) to determine a prediction outcome thereof of whether the given event sequence is associated with the malicious activity, the trained MLA having been trained to determine whether the given event sequence is associated with the malicious activity based on the respective internal state markers of the given host associated therewith; and in response to the prediction outcome exceeding a predetermined threshold value, determining, by the processor, the given event sequence having been occurred at the given host as being associated with the malicious activity; generating, by the processor, a report including the prediction outcome for presentation thereof to a user.

In some implementation of the method, prior to applying the plurality of signature-based rules, the method further comprises storing the respective internal event in a pipeline of internal events.

In some implementation of the method, the determining the at least one internal state marker comprises detecting one of malicious activity and object in one of the given host of the plurality of hosts and a network thereof.

In some implementation of the method, the at least one internal state marker is valid for a predetermined period.

In some implementation of the method, the at least one internal state marker has been pre-assigned with a respective weight value.

In some implementation of the method, at least one internal state indicated by the at least one internal state marker comprises at least one of: a set of flags indicative of a current state of the given host, file paths, a registry, processes, signatures, mutexes, synchronization objects, and counters.

In some implementation of the method, the at least one internal state is valid for a predetermined period.

In some implementation of the method, the trained MLA comprises at least one of: a linear model, a classifier, and a neural network.

In some implementation of the method, the report further comprises at least one of: signature markers, information of the given host, contents of environment variables of processes running during occurrences of the given event sequence, information about connected devices, a screenshot, a screen video at a moment of the determining the given event sequence as being associated with the malicious activity, a sequence of user actions executed prior to the given event sequence, an incident graph.

In accordance with a second broad aspect, there is provided a system for detecting a malicious activity by analyzing objects behavior in a non-isolated environment. The system comprises: a processor communicatively coupled to a plurality of hosts of the non-isolated environment and a non-transitory computer-readable memory storing instructions. The processor, upon executing the instructions, is configured to: receive, from a given host of the plurality of hosts, an event flow including data representative of events occurred at the given host; analyze a given event sequence of the event flow having been generated for a predetermined period, to generate, for a given event of the given event sequence, a respective internal event, the respective internal event being format-invariant to other events in the event flow; apply, to the respective internal event, a plurality of signature-based rules to determine at least one internal state marker of the given host associated with the given event sequence, respective internal state markers associated with the each one of the given event sequence being indicative of whether the given event sequence is associated with the malicious activity or not; feed the respective internal state markers to a trained machine-learning algorithm (MLA) to determine a prediction outcome thereof of whether the given event sequence is associated with the malicious activity, the trained MLA having been trained to determine whether the given event sequence is associated with the malicious activity based on the respective internal state markers of the given host associated therewith; and in response to the prediction outcome exceeding a predetermined threshold value, determine the given event sequence having been occurred at the given host as being associated with the malicious activity; generate a report including the prediction outcome for presentation thereof to a user.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Implementation of the technique will be further described in accordance with the attached drawings, which are presented to clarify the technique chief matter and by no means limit the field of the technique. The following drawings are attached to the application:

FIG. 2 depicts a flowchart diagram of a method for detecting malicious activity by analyzing behavior of objects in a non-isolated environment, in accordance with certain non-limiting embodiments of the present technology.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

System

Figure 1:
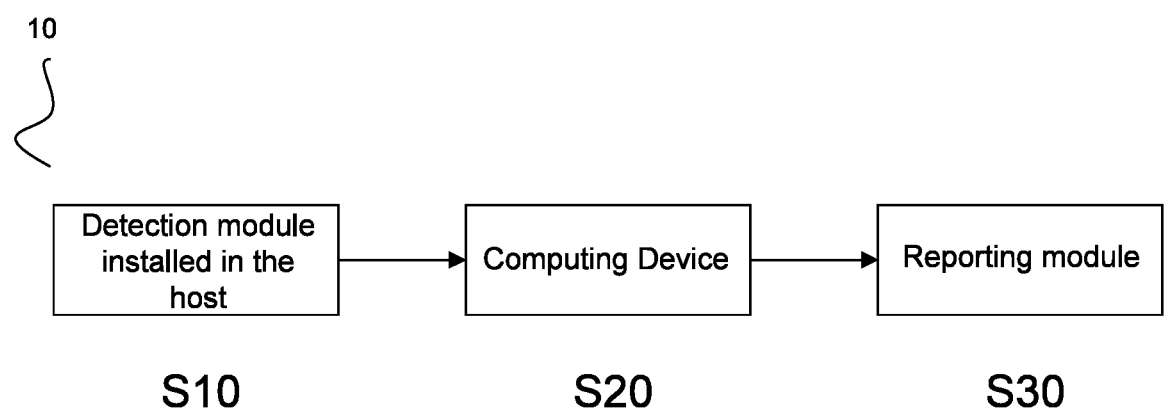
FIG. 1 depicts a schematic diagram of a system for detecting malicious activity by analyzing behavior of objects in a non-isolated environment, in accordance with certain non-limiting embodiments of the present technology.

With reference to FIG. 1, there is provided a schematic diagram of a system 10 configurable for detecting malicious activity by analyzing behavior of objects in a non-isolated environment, in accordance with certain non-limiting embodiments of the present technology. The system 10 comprises:

- a detection module (S10) installed in a given host of a plurality of hosts of the non-isolated environment, which, according to certain non-limiting embodiments of the present technology, can be configured to collect information about at least one event flow of events occurred at the given host and to transmit the at least one event flow to a computing device (S20) for analyzing;
- the computing device (S20) configured to implement a method, such as a method 100, for detecting, based on the received event flow, malicious activity by analysis of object behavior in the non-isolated environment, described below with reference to FIG. 2; and
- a reporting module (S30).

According to certain non-limiting embodiments of the present technology, the computing device S20 can comprise a computing environment 300 described below with reference to FIG. 3. To that end, the computing device S20 can include a processor 301.

It should be understood that the system 10 described herein is completely scalable, that is, it can operate as in local as in global network.

Method

With reference to FIG. 2, there is depicted a method 100 for detecting malicious activity by analyzing behavior of objects in a non-isolated environment, in accordance with certain non-limiting embodiments of the present technology. The method 100 can be executed, for example, by the processor 301 of the computing device S20.

It should be noted that, according to certain non-limiting embodiments of the present technology, the processor 301 can be coupled to data collection software, for example, security event detection modules or security event monitors, such as those of the detection module S10, which are installed at the given host of the plurality of hosts and are configured for maintaining logs and recording suspicious events in the network.

It should be noted that, in the context of the present specification, the given host denotes a network node. Thus, the given host can comprise a physical devices—such as computers, servers, laptops, smartphones, tablets, game consoles, TV sets, printers, network hubs, switches, routers, unspecified devices combined by IoT (Internet of Things), etc., or hardware-software solutions enabling to implement functionality of several network nodes at a single physical device.

Step 110: Receiving, by the Processor, From a Given Host of the Plurality of Hosts, an Event Flow Including Data Representative of Events Occurred at the Given Host The method 100 commences at step 110 with the processor 301 being configured to receive at least one event flow having been collected by the detection module (S10) of the system 10. For example, in some non-limiting embodiments of the present technology, the at least one event flow can include data representative of events having occurred at the given host.

According to certain non-limiting embodiments of the present technology, the event flow comprises at least one event having occurred at the given host including, for example, without limitation, file creation, file deletion, file renaming, registry key creation, recording of values into the registry, deleting of values from the registry, deleting of the registry key, process creation and termination, process thread creation and termination, log event, creating a kernel object, and the like.

Further, in some non-limiting embodiments of the present technology, along with the event flow, the processor 301 can be configured to receive form the detection module S10, additional information on the given host, such as a sandbox verdict on files in it or host screen video, if it is equipped with a screen, and other information.

It should be expressly understood that the non-limiting embodiments of the present technology are based on a premise that, initially, all events in the event flow are not trusted and potentially malicious.

Therefore, the raw event flow received by the computing device (S20) from the host monitors is stored in a memory, such as a storage 303 thereof described below with reference to FIG. 3.

The method 100 thus proceeds to step 111.

Step 111: Analyzing, by the Processor, a Given Event Sequence of the Event Flow Having Been Generated for a Predetermined Period, to Generate, for a Given Event of the Given Event Sequence, a Respective Internal Event, the Respective Internal Event Being Format-Invariant to Other Events in the Event Flow Further, at step 111, the processor 301 can be configured to identify, from the event flow, a given event sequence including data representative of the events having occurred at the given host over a predetermined period. Further, the processor 301 can be configured to generate, for a given event of the given event sequence, a respective internal event.

According to certain non-limiting embodiments of the present technology, the respective internal event is an event that is format-invariant to other events in the event flow and signature-based rules to be applied thereto, as will be described below.

Further, the processor 301 can be configured to store the respective internal events for each one of the given event sequence in the storage 301 as a pipeline of internal events. For example, the processor 301 can be configured to organize the pipeline of internal events as a process tree.

For example, if the processor 301 inputs the respective internal event, such as ProcessCreated #1, the pipeline, the processor 301 can further be configured to store information of the process in the process tree. Also, the processor 301 can be configured to store, in the process tree, additional information associated with the respective internal event, which has been received at step 110, such as sandbox verdict on the files, screen video, and the like.

The method 100 thus advances to step 112.

Step 112: Applying, by the Processor, to the Respective Internal Event, a Plurality of Signature-Based Rules to Determine at Least One Internal State Marker of the Given Host Associated With the Given Event Sequence Further, at step 112, the processor 301 can be configured to apply, to the respective internal event, a plurality of signature-based rules. Further, in response to the respective internal event corresponding to at least one of the plurality of signature-based rules, the processor 301 can be configured to determine at least one internal state marker of the given host during occurrence of the given event sequence.

For example, the processor 301 can be configured to apply the signature wer_dump to the respective internal event ProcessCreated #2. In response to the respective internal event corresponding to this signature, the processor 301 can be configured to determine a failed process in the process tree and create the at least one internal state marker being "process failed".

Also, in additional non-limiting embodiments of the present technology, to determine the at least one internal state marker of the given host, the processor 301 can be configured to use the additional information received from the detection module S10 at step 110.

Therefore, at step 112, the processor 301 can be configured to store the respective internal event and the at least internal state marker associated therewith. By way of example, in some non-limiting embodiments of the present technology, the processor 301 can be configured to store BootTime in order to determine the computer rebooting time of the given host, and also create a respective internal state marker, which in combination with the other internal state markers could be indicative of the given event sequence being associated with the malicious activity and/or malicious object detected in the network or at the given host of the plurality of hosts. Accordingly, if no such information is detected, the processor 301 does not determine the respective internal state marker.

According to certain non-limiting embodiments of the present technology, the internal state of the given host indicated by the at least one internal state marker could comprise at least one of set of flags indicative of a current state of the given host, file paths, registry, processes, their signatures, mutexes, events (synchronization objects), networking, and also different counters. Also, the internal state has a predetermined validity period, which could be infinite as well as finite, such as of a predetermined duration.

Further, according to certain non-limiting embodiments of the present technology, each internal state marker of the at least one internal state marker can be pre-assigned with a respective weight value and a predetermined validity period. Besides, the predetermined validity period can be predetermined based on test results for how indicative the respective internal state markers are of the malicious activity. More specifically, when the processor 301 has detected a malicious activity, it may further be configured to identify periods, during which a minimum number of errors of first and second kind have been occurred.

In the context of the present specification, errors of first kind are errors of denying a correct null hypothesis. For example, when a given internal state marker has been determined as being indicative of a non-malicious activity.

Further, in the context of the present specification, errors of second kind are errors of accepting an incorrect null hypothesis. For example, when the given internal marker has been determined as being non-indicative of a malicious activity or object.

Additionally, the processor 301 can be configured to store, such as in the storage 303, all the information having determined at step 112, such as the respective internal state markers and data of the respective internal states associated therewith with indication of their validity periods. The information is deleted, if its validity period has expired, and the internal state is then changed. In some non-limiting embodiments of the present technology, when the internal state is changed, the processor 301 can further be configured to determine a new respective internal state marker.

The method 100 hence advances to step 113.

Step 113: Feeding, by the Processor, the Respective Internal State Markers to a Trained Machine-Learning Algorithm (MLA) to Determine a Prediction Outcome Thereof of Whether the Given Event Sequence is Associated With the Malicious Activity At step 113, according to certain non-limiting embodiments of the present technology, the processor 301 can be configured to feed the respective internal state markers associated with each one of the given event sequence to a trained machine-learning algorithm (MLA) to determine a prediction outcome indicative of whether the given event sequence is associated with a malicious activity and/or object or not.

According to certain non-limiting embodiments of the present technology, the trained MLA has been trained, such as by the processor 301, to determine whether the given event sequence is associated with the malicious activity based on a training set of data including, for example: (1) respective arrays of training internal state markers associated with training event sequences; and (2) respective labels assigned to the training event sequences indicative of whether these training event sequences are associated with one the malicious activity and object or not.

According to certain non-limiting embodiments of the present technology, the trained MLA comprises at least one of: a linear model (such as an SVM model), a classifier (such as a decision tree-based model, for example, a Random Forest model), and a neural network.

The method 100 thus proceeds to step 114.

Step 114: In Response to the Prediction Outcome Exceeding a Predetermined Threshold Value, Determining, by the Processor, the Given Event Sequence Having Been Occurred at the Given Host as Being Associated With the Malicious Activity At step 114, according to certain non-limiting embodiments of the present technology, the processor 301 can be configured to compare the prediction outcome of the trained MLA so determined at step 113 with a predetermined threshold value. Further, in response to the predicted outcome exceeding the predetermined threshold value, the processor 301 can be configured to determine that the given event sequence having occurred at the given host is associated with the one of the malicious activity and object.

In one example where the trained MLA comprises the linear model, the processor 301 can be configured to determine that the given event sequence is associated with the one of the malicious activity and object if a total weight of the respective internal state markers associated with the given event sequence is greater than a predetermined weight threshold.

In another example where the trained MLA comprises the classifier configured to generate, based on the respective internal state markers, a probability value, the processor 301 can be configured to determine that the given event sequence having occurred at the given host is associated with the one of the malicious activity and object if the probability value is greater than 50%. It is worth noting that, the features fed to the classifiers may include not only the respective internal state markers associated with the given event sequence, but also, in addition, any information from the context, the additional information from the pipeline, that is, stored in the process tree, performance counters, as mentioned above.

In yet another example where the trained MLA is implemented as a set of finite state machines complying with the behavior requirements, the processor 301 can be configured to determine the malicious activity based on differences from the behavior complying with the requirements.

The method 100 thus proceeds to step 115.

Step 115: Generating, by the Processor, a Report Including the Prediction Outcome for Presentation Thereof to a User Finally, at step 115, according to certain non-limiting embodiments of the present technology, the processor 301 can be configured to generate a report, for example, to the storage 303, such as a disk, database, syslog, and the like, including the prediction outcome determined at step 113 and a respective verdict of analyzing the given event sequence determined, based on the predetermined threshold value, at step 114.

For example, the report may also comprise at least one of: at least some of the respective internal state markers associated with the given event sequence, the respective verdict, process tree, host name, content of environment variables, information about connected devices, screenshot, screen video during detection, sequence of user actions, incident graph (the process initiating an incident with relationships-interactions, created files, created network connections, etc.), associated with the given host, and the like.

Alternatively, in lieu of generating the report, the processor 301 can be configured to store each marker information in the memory, such as the storage 303, for further statistical calculation.

The method 100 hence terminates.

Computing Environment

Figure 3:
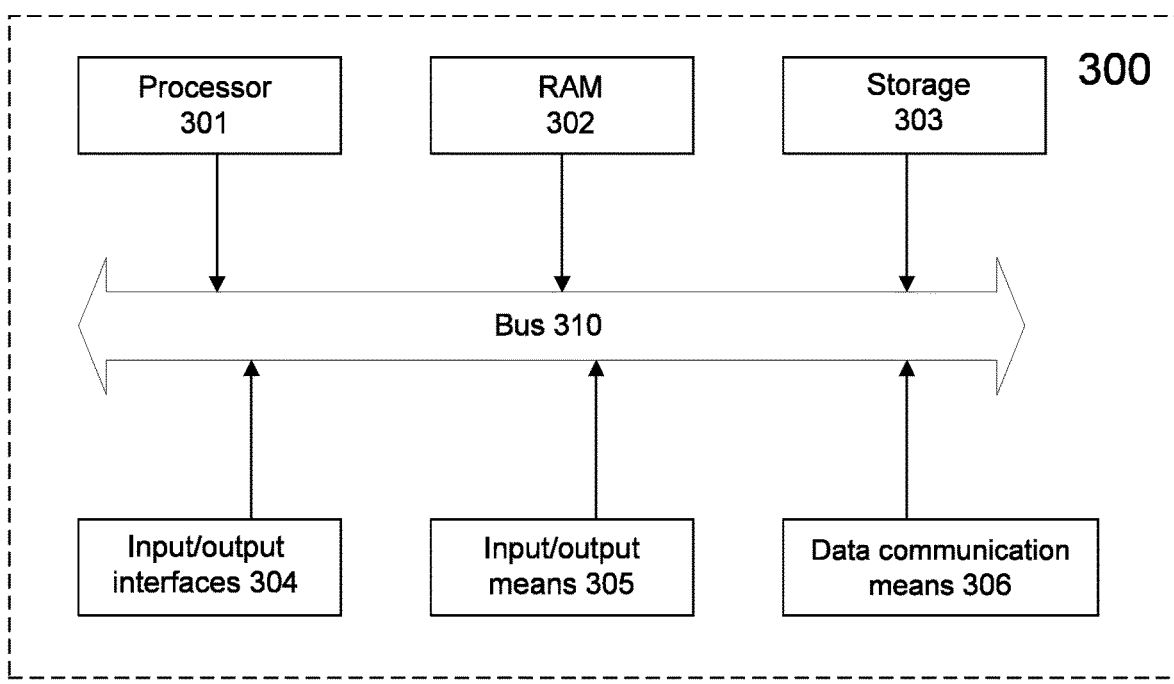
FIG. 3 depicts a schematic diagram of an example computing environment configurable for execution of the present method of FIG. 2, in accordance with certain non-limiting embodiments of the present technology.

With reference to FIG. 3, there is depicted an example functional diagram of the computing environment 300 configurable to implement certain non-limiting embodiments of the present technology including the method 100, described above.

In some non-limiting embodiments of the present technology, the computing environment 300 may include: the processor 301 comprising one or more central processing units (CPUs), at least one non-transitory computer-readable memory 302 (RAM), a storage 303, input/output interfaces 304, input/output means 305, data communication means 306.

According to some non-limiting embodiments of the present technology, the processor 301 may be configured to execute specific program instructions the computations as required for the computing environment 300 to function properly or to ensure the functioning of one or more of its components. The processor 301 may further be configured to execute specific machine-readable instructions stored in the at least one non-transitory computer-readable memory 302, for example, those causing the computing environment 300 to execute the method 100, as an example.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 302 may be implemented as RAM and contains the necessary program logic to provide the requisite functionality.

The storage 303 may be implemented as at least one of an HDD drive, an SSD drive, a RAID array, a network storage, a flash memory, an optical drive (such as CD, DVD, MD, Blu-ray), etc. The storage 303 may be configured for long-term storage of various data, e.g., the aforementioned documents with user data sets, databases with the time intervals measured for each user, user IDs, etc.

The input/output interfaces 304 may comprise various interfaces, such as at least one of USB, RS232, RJ45, LPT, COM, HDMI, PS/2, Lightning, FireWire, etc.

The input/output means 305 may include at least one of a keyboard, a joystick, a (touchscreen) display, a projector, a touchpad, a mouse, a trackball, a stylus, speakers, a microphone, and the like. A communication link between each one of the input/output means 305 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 306 may be selected based on a particular implementation of a network, to which the computing environment 300 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 304 may be configured for wired and wireless data transmission, via one of a WAN, a PAN, a LAN, an Intranet, the Internet, a WLAN, a WMAN, or a GSM network, as an example.

These and other components of the computing device 300 may be linked together using a common data bus 310.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to provide certain examples of implementation of the non-limiting embodiments of the present technology rather than to be limiting. The scope of the present technology is therefore intended to be limited solely by the scope of the appended claims.

The invention claimed is:

1. A computer-implemented method for detection of a malicious activity by analyzing object behavior in a non-isolated environment, the method comprising:
receiving, from a given host of a plurality of hosts of the non-isolated environment, an event flow including data representative of events that occurred at the given host;
analyzing, a given event sequence of the event flow having been generated for a predetermined period, to generate, for a given event of the given event sequence, a respective internal event, the respective internal event being format-invariant to other events in the event flow;
applying, to the respective internal event, a plurality of signature-based rules to determine at least one internal state marker of the given host associated with the given event of the given event sequence,
the respective internal state marker being indicative of a then current state of the given host during an occurrence of the given event of the given event sequence; and
respective internal state markers associated with the given event sequence being indicative of whether the given event sequence is associated with the malicious activity or not;
feeding the respective internal state markers to a trained machine-learning algorithm (MLA) to determine a prediction outcome thereof of whether the given event sequence is associated with the malicious activity,
the trained MLA having been trained to determine whether the given event sequence is associated with the malicious activity using a training set of data comprising: (i) arrays of training internal state markers associated with training event sequences; and (ii) a respective label assigned to each of the training event sequences, the respective label for a given training event sequence being indicative of whether the given training event sequence is associated with the malicious activity or not;
in response to the prediction outcome exceeding a predetermined threshold value, determining that the given event sequence having occurred at the given host is associated with the malicious activity; and
generating a report including the prediction outcome for presentation thereof to a user.

2. The method of claim 1, prior to applying the plurality of signature-based rules, further comprising storing the respective internal event in a pipeline of internal events.

3. The method of claim 1, wherein the determining the at least one internal state marker comprises detecting one of malicious activity and object in one of the given host of the plurality of hosts and a network thereof.

4. The method of claim 3, wherein the at least one internal state marker is valid for the predetermined period.

5. The method of claim 3, wherein the at least one internal state marker has been pre-assigned with a respective weight value.

6. The method of claim 1, wherein at least one internal state indicated by the at least one internal state marker comprises at least one of: a set of flags indicative of the then current state of the given host, file paths, a registry, processes, signatures, mutexes, synchronization objects, and counters.

7. The method of claim 6, wherein the at least one internal state is valid for the predetermined period.

8. The method of claim 1, wherein the trained MLA comprises at least one of: a linear model, a classifier, and a neural network.

9. The method of claim 1, wherein the report further comprises at least one of: signature markers, information of the given host, contents of environment variables of processes running during occurrences of the given event sequence, information about connected devices, a screenshot, a screen video at a moment of the determining the given event sequence as being associated with the malicious activity, a sequence of user actions executed prior to the given event sequence, an incident graph.

10. A system for detecting a malicious activity by analyzing objects behavior in a non-isolated environment, the system comprising: at least one processor communicatively coupled to a plurality of hosts of the non-isolated environment and at least one non-transitory computer-readable memory storing instructions, which when executed by the at least one processor, cause the system to:
- receive, from a given host of the plurality of hosts, an event flow including data representative of events that occurred at the given host;
- analyze a given event sequence of the event flow having been generated for a predetermined period, to generate, for a given event of the given event sequence, a respective internal event, the respective internal event being format-invariant to other events in the event flow;
- apply, to the respective internal event, a plurality of signature-based rules to determine at least one internal state marker of the given host associated with the given event sequence,
  - the respective internal state marker being indicative of a then current state of the given host during an occurrence of the given event of the given event sequence; and
  - respective internal state markers associated with the given event sequence being indicative of whether the given event sequence is associated with the malicious activity or not;
- feed the respective internal state markers to a trained machine-learning algorithm (MLA) to determine a prediction outcome thereof of whether the given event sequence is associated with the malicious activity,
  - the trained MLA having been trained to determine whether the given event sequence is associated with the malicious activity using a training set of data comprising: (i) arrays of training internal state markers associated with training event sequences; and (ii) a respective label assigned to each of the training event sequences, the respective label for a given training event sequence being indicative of whether the given training event sequence is associated with the malicious activity or not;
- in response to the prediction outcome exceeding a predetermined threshold value, determine that the given event sequence having occurred at the given host is associated with the malicious activity; and
- generate a report including the prediction outcome for presentation thereof to a user.

* * * * *